C. E. JONES.
WEED CUTTER.
APPLICATION FILED MAR. 25, 1912.

1,081,746.

Patented Dec. 16, 1913.

Witnesses
Edwin F. McKee
Philip Terrell

Inventor
Clifford E. Jones
By
Attorney

UNITED STATES PATENT OFFICE.

CLIFFORD E. JONES, OF EIGHTMILE, OREGON.

WEED-CUTTER.

1,081,746.   Specification of Letters Patent.   Patented Dec. 16, 1913.

Application filed March 25, 1912.  Serial No. 685,928.

*To all whom it may concern:*

Be it known that I, CLIFFORD E. JONES, a citizen of the United States, and a resident of Eightmile, in the county of Morrow and State of Oregon, have invented certain new and useful Improvements in Weed-Cutters, of which the following is a specification, reference being had to the accompanying drawings.

This invention has relation to certain new and useful improvements in cutters of that class which are dragged over the field and are especially adapted to be used in fallow ground; and the object of my invention is to provide a cutter of this general character of a simple and inexpensive nature and of a compact and durable construction, arranged so that a plurality of oppositely directed drag knives are drawn through the field to loosen the soil and cut the weeds as well.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

Figure 1:
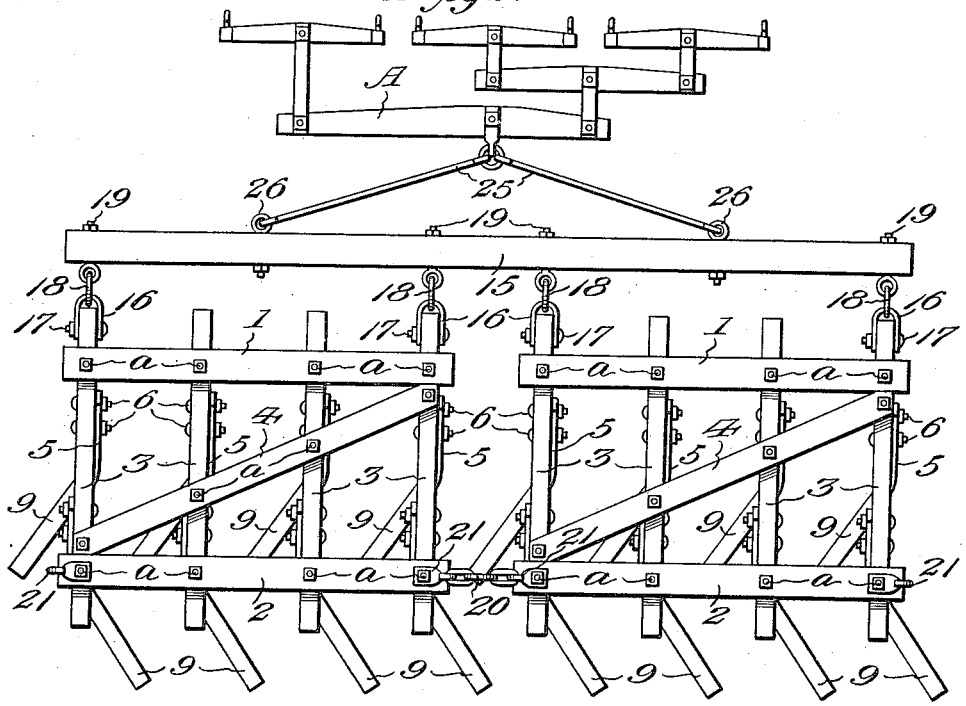
Figure 2:
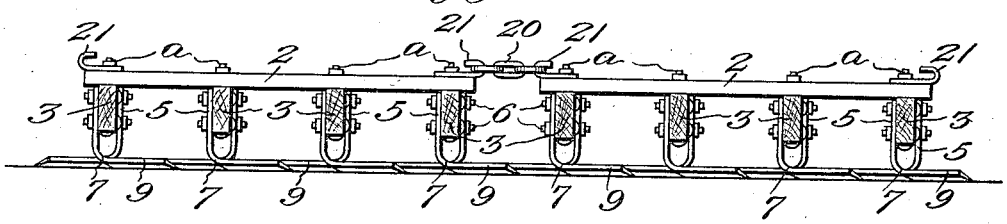
Figure 3:
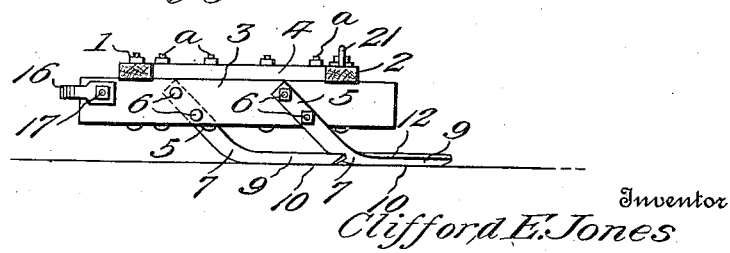

In the accompanying drawings forming a part of this specification and in which like numerals of reference indicate similar parts in the several views; Figure 1, shows a top view of a two frame weed cutter embodying my invention. Fig. 2, shows a rear view. Fig. 3, is an end view.

In my present invention I provide a weed cutter especially adapted to be used in the cultivation of fallow ground, that is, ground left unseeded for a time. With my invention such ground cannot only be kept free of weeds, but in removing the weeds the top of the soil is cultivated and dressed, in that the cut weeds form a mulch so that by the time of planting the ground will be in the best possible condition.

In carrying out the aim of my invention I employ a frame comprising a front bar 1, a rear bar 2, and a plurality of sills 3, secured to the members 1 and 2 in parallel spaced relation. The sills 3, are slightly mortised as shown in Fig. 3, to receive the members 1 and 2, these members being secured to the upper edges of the sills by means of suitable bolts *a*. To further add rigidity to the frame, I employ a cross bar 4, which is also secured by means of suitable bolts *a*, this bar being positioned between the bars 1 and 2. Secured to opposite sides of each sill 3, are the cutting members which are in the form of knives made of flat strap metal, preferably of a good quality of tool steel.

As shown in Fig. 3, each knife comprises an apertured securing stem 5, through the apertures of which extend the securing bolts 6. Each stem is obliquely secured to one vertical face of the sill. The blades or cutting portions of each knife include a crooked or curved portion 7, from which the blade proper is continued laterally and rearwardly, as will be understood in referring to Fig. 1.

Each blade is wedge-shaped in cross section and is tilted so that the forward cutting edge 10, is lower than the rear edge 12, of the knife. As shown in Figs. 2 and 3, the cutting edges of all of the knives end and extend in a common plane.

In the drawings each sill 3, is shown as giving support to two drag knives and these knives are so positioned that their curved or crooked portions 7, extend below the lower edge of the sill to which the knife is secured, the blade 9 extending obliquely, laterally and rearwardly. The knives upon each sill extend in opposite directions, this requiring two kinds of knives which for convenience I call right handed and left handed knives. The knives extend rearward of the line of advance, as will be understood in referring to Fig. 1.

For the sake of convenience, I employ a lead bar 15, to which two or more of the drag frames are secured. As shown, I provide the two end sills of each frame with a clevis 16, held by means of a bolt 17, each clevis carrying a link 18, engaging an eyebolt 19, secured to the lead bar 15, this construction being shown in Fig. 1. The frames in turn are shackled together at their rear inner ends by means of a chain section 20 engaging the hook plates 21, each frame having such a hook plate as shown. These hook plates are held in position by the bolts *a*, securing the rear bars to the end sills 3.

As shown in Fig. 2, the knives are made to extend outward a distance sufficient so that the ground is cultivated the entire distance between the points of the outer edge knives. The links 18 permit each frame to swing from side to side within certain limits, so that each frame is yieldingly held to the lead bar 15. Owing to the crooked or curved portion 7 and the flat stems 5, the blades are resiliently held to the sills and in being dragged through the earth vibrate, resulting in the earth layer removed by the knives being broken up. This is an important feature of my invention, as is the arrangement of securing the knives to the sills.

In Fig. 1, I have shown a 3 horse evener A, secured to the lead bar 15, by means of the connecting rods 25, secured to the eye-bolts 26.

A weed cutter constructed according to my invention is simple and inexpensive and both durable and efficient in operation.

Having thus described my said invention, what I claim as new and desire to secure by United States Letters Patent is:

1. A weed cutter comprising a frame consisting of front and rear cross bars and a plurality of sills secured to said bars and spaced apart, and a series of knives bolted to said sills upon opposite sides thereof, each knife extending underneath the sill and having its blade in a horizontal plane at the opposite side of the sill from its point of attachment to said sill whereby a complete unbroken cutting edge is presented across the entire weed cutter.

2. A weed cutter comprising a plurality of frames flexibly connected to a lead bar and permitted to swing freely within certain limits laterally, sills carried by said frames and extending in the line of draft, knives connected to said sills upon opposite sides thereof, said knives each extending underneath the sill and projecting rearwardly and backwardly therefrom, the knives of each sill projecting at different angles and the cutting edges of said knives forming two complete unbroken cutting edges extending entirely across the weed cutter.

In testimony whereof I affix my signature, in presence of two witnesses.

CLIFFORD E. JONES.

Witnesses:
C. H. RHEA,
EDWIN M. HAWLEY.

---

Copies of this patent may be obtained for five cents each, by addressing the "Commissioner of Patents, Washington, D. C."